E. M. WYLY.
FASTENING DEVICE FOR FREIGHT CAR DOORS.
APPLICATION FILED AUG. 26, 1912.

1,068,198. Patented July 22, 1913.

Inventor
E. M. Wyly

UNITED STATES PATENT OFFICE.

EMANUEL M. WYLY, OF CHATTANOOGA, TENNESSEE.

FASTENING DEVICE FOR FREIGHT-CAR DOORS.

1,068,198. Specification of Letters Patent. Patented July 22, 1913.

Application filed August 26, 1912. Serial No. 717,165.

*To all whom it may concern:*

Be it known that I, EMANUEL M. WYLY, a citizen of the United States, residing at Chattanooga, in the county of Hamilton and State of Tennessee, have invented certain new and useful Improvements in Fastening Devices for Freight-Car Doors, of which the following is a specification.

My invention relates to devices for fas10 tening freight car doors.

Heretofore freight car doors have been fastened by hasps and staples or the like secured to the forward end of the door and to the side of the car, but this means of fas15 tening the door has been found to be undesirable because of the danger of breaking the locks by the weight of the freight within the car being thrown against the door, and my invention is designed to overcome this defect.

My invention has for its object the provision of a device for locking the door consisting of a bar pivotally secured to the sill of the car and having an offset portion forming a shoulder that engages the rear edge of the door when locked and having hooks pivotally secured thereto that engage staples extending through slots in the bar and mounted on the door and the side of the car, the staple mounted on the car being pivotally secured so that it drops out of the way when not in the locking position to prevent it from interfering with the movement of the door in opening it. By this construction, the door will be securely braced to the side of the car and held rigidly in position to prevent it from being broken away from the car when subjected to the weight of the freight within the car in coupling trains and when the car leans to either side for any reason.

Figure 1:
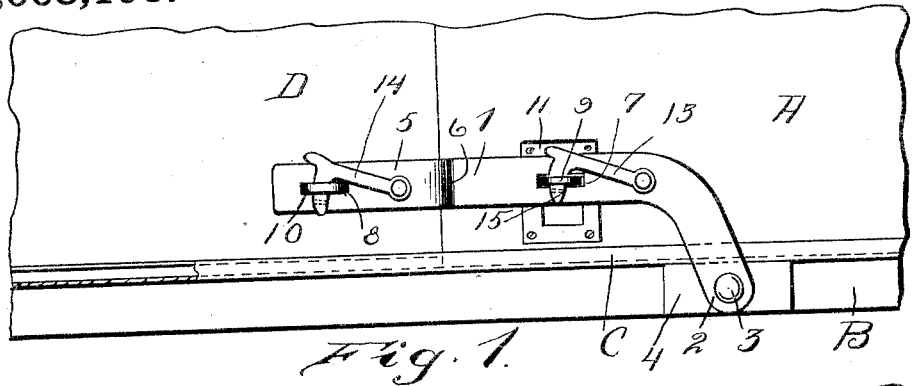
Figure 2:
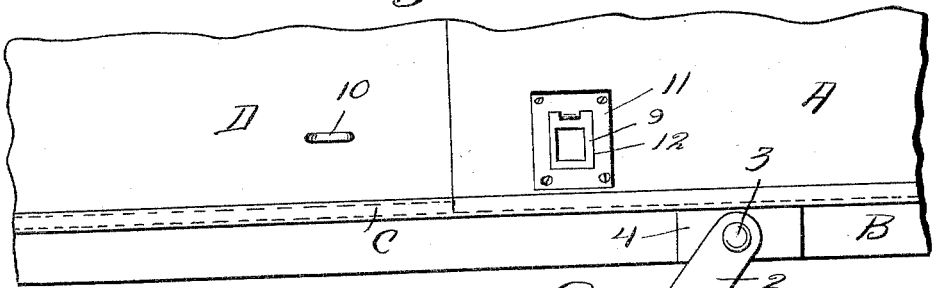
Figure 4:
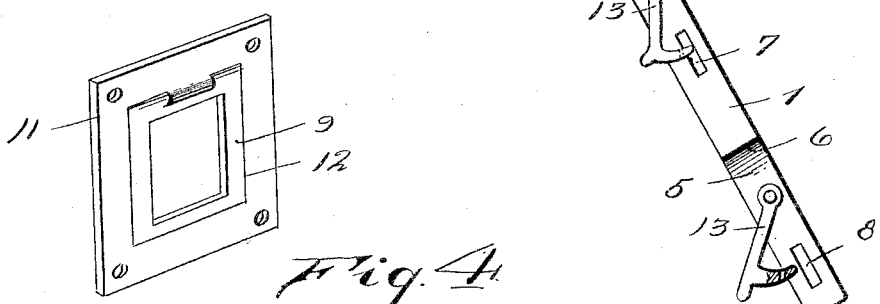
Figure 3:
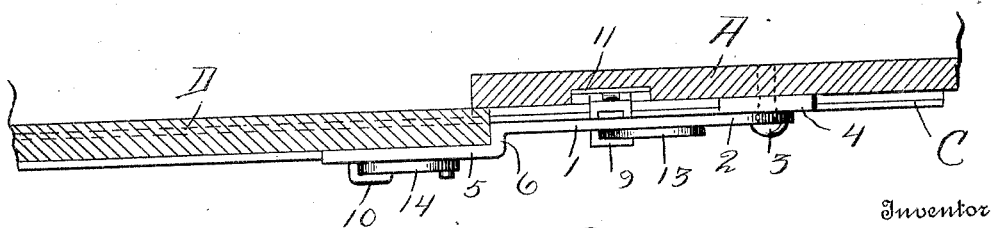

My invention will be described in detail hereinafter and illustrated in the accompanying drawings, in which, Figure 1 is a side of a fragment of a car and door showing my improved locking device in locked position; Fig. 2, a similar view showing the door unlocked and ready to be opened; Fig. 3, a longitudinal sec50 tional view of the fragment shown in Fig. 1; and Fig. 4, a detail view of the staple secured to the car.

In the drawings, similar reference characters will be used to designate correspond55 ing parts throughout the several views.

A indicates a car having a sill B and the track C on which is slidably mounted the door D.

My improved locking device consists of a bar 1 having a downwardly curved extension 2 pivotally secured to the sill B by means of the pin 3, 4 indicating a spacing block secured to the sill to throw the bar outside of the track C. The longitudinal portion of the bar 1 is formed with an offset portion 5 forming a shoulder 6 that engages the rear edge of the door when in locked position.

7 indicates a slot in the bar 1 and 8 a slot in the offset portion 5 to receive staples 9 and 10 mounted on the car A and the door D respectively. The staple 9 is as shown, pivotally secured to a plate 11 set into the side of the car and when not engaging the slot 7, said staple drops into a recess 12 in said plate 11 to prevent the staple from interfering with the movement of the door D in opening it.

13 and 14 indicate hooks pivotally secured to bar 1 and offset portion 5 and adapted to engage the staples 9 and 10 when the device is in a locked position as shown in Fig. 1, said hooks being provided with transverse openings 15 to receive the wires for the seals commonly employed in sealing the doors.

When in use and in locked position as shown in Fig. 1, it will be apparent that the bar 1 and offset portion 5 by being locked to the car A and door D will act as a brace to prevent outward movement of the door when subjected to the weight of the freight within the car and furthermore, that the shoulder 6 on the bar by engaging the rear edge of the door will protect the locking members from the effect of backward and forward movement of the door incident to the effects of the inertia in pulling and pushing the car while traveling and making up trains. When it is desired to open the door, it will be apparent that by swinging the hooks 13 and 14 up and out of engagement with the staples 9 and 10, the bar 1 may then be moved away from the door and car sufficiently to release it from engagement with said staples and the bar will drop into the position shown in Fig. 2. At the same time the staple 9 will drop into the recess 12 in the plate 11 and the door may be opened. It will be apparent that sufficient side play must be provided between the end 2 of the bar 1 and the pin 3 to permit said sidewise movement of the bar in unlocking it.

Having thus described my invention what I claim is:—

1. In combination with a freight car and a door slidably mounted on the outside of the car, a bar pivotally secured to the car and having a shoulder to engage the edge of the door, said bar having slots therein, staples mounted on the car and door and adapted to enter said slots, and means secured to said bar to engage said staples.

2. In combination with a freight car and a sliding door mounted thereon, an angular bar pivotally secured to said car and having slots therein, a staple pivotally secured to the car and adapted to engage one of said slots, a staple secured to the door and adapted to engage the other slot, and hooks pivotally secured to the bar and adapted to engage said staples.

3. In combination with a car mounted on a sill and a door slidably mounted on the car, an angular bar pivotally secured to said sill and having an offset portion forming a shoulder to engage the rear edge of the door when in a closed position, said bar being formed with a slot and the offset portion provided with a slot, a staple pivotally secured to the car and adapted to engage the first mentioned slot, a staple secured to the door and adapted to engage the slot in the offset portion, and hooks pivotally secured to said slots and adapted to engage said staples.

4. In combination with a freight car and the door slidably mounted on the outside thereof, an angular bar pivotally secured to the car and having a shoulder thereon adapted to engage the edge of said door, said bar having slots therein, the pivot of said bar being arranged transversely thereof so that said bar moves through an arc of a circle having its plane parallel to the side of the car, staples secured to the car and door and adapted to engage the slots in the bar, and means mounted on the bar to engage said staples.

In testimony whereof I affix my signature in presence of two witnesses.

EMANUEL M. WYLY.

Witnesses:
MARTIN LOVELADY,
C. M. NEWTON.

---

Copies of this patent may be obtained for five cents each, by addressing the "Commissioner of Patents, Washington, D. C."